(12) United States Patent
Labovitz et al.

(10) Patent No.: US 8,879,415 B2
(45) Date of Patent: Nov. 4, 2014

(54) METHOD AND SYSTEM FOR ANNOTATING NETWORK FLOW INFORMATION

(71) Applicants: Craig H. Labovitz, Ann Arbor, MI (US); Joseph Eggleston, Ann Arbor, MI (US); Scott Iekel-Johnson, Ann Arbor, MI (US)

(72) Inventors: Craig H. Labovitz, Ann Arbor, MI (US); Joseph Eggleston, Ann Arbor, MI (US); Scott Iekel-Johnson, Ann Arbor, MI (US)

(73) Assignee: Arbor Networks, Inc., Burlington, MA (US)

( * ) Notice: Subject to any disclaimer, the term of this patent is extended or adjusted under 35 U.S.C. 154(b) by 15 days.

(21) Appl. No.: 13/782,776

(22) Filed: Mar. 1, 2013

(65) Prior Publication Data
US 2013/0290521 A1    Oct. 31, 2013

Related U.S. Application Data

(63) Continuation of application No. 11/967,130, filed on Dec. 29, 2007, now abandoned.

(51) Int. Cl.
H04L 12/26 (2006.01)
H04L 29/06 (2006.01)
H04L 12/24 (2006.01)

(52) U.S. Cl.
CPC ........ *H04L 43/0876* (2013.01); *H04L 63/1408* (2013.01); *H04L 43/00* (2013.01); *H04L 41/12* (2013.01); *H04L 12/2602* (2013.01)

USPC .......................................... 370/252; 709/224

(58) Field of Classification Search
None
See application file for complete search history.

(56) References Cited

U.S. PATENT DOCUMENTS

| | | | |
|---|---|---|---|
| 2003/0039212 A1* | 2/2003 | Lloyd et al. | 370/235 |
| 2006/0230238 A1* | 10/2006 | Roy et al. | 711/141 |
| 2007/0140128 A1* | 6/2007 | Klinker et al. | 370/238 |

OTHER PUBLICATIONS

Cisco Systems, Inc., White Paper, "Cisco IOS NetFlow Version 9 Flow-Record Format," 13 pages, C11-395693-00, Feb. 2007, 14 pages.*

* cited by examiner

*Primary Examiner* — Mohammad Adhami
(74) *Attorney, Agent, or Firm* — Edwards Wildman Palmer LLP; Scott D. Wofsy; Christopher J. Capelli

(57) ABSTRACT

A scalable flow monitoring solution takes in standard flow records exported from network devices such as routers, switches, firewalls, hubs, etc., and annotates the flow with additional information. This information is derived from a number of sources, including Border Gateway Protocol (BGP), Simple Network Management Protocol (SNMP), user configuration, and other, intelligent flow analysis. These annotations add information to the flow data, and can be used to perform value-added flow analysis. The annotated flow is then resent to a configurable set of destinations using standard flow formatting, e.g., Cisco System Inc.'s NetFlow, in one implementation. This allows the annotated flow to be processed and the enhanced information to be used by other flow analysis tools and existing flow analysis infrastructure.

18 Claims, 7 Drawing Sheets

| 0 | 1 | 2 | 3 |
|---|---|---|---|
| Netflow Version | | Record Count | |
| System Uptime ||||
| Unix Seconds (timestamp) ||||
| Sequence Number ||||
| Source ID ||||

Fig. 4

| 0 | 1 | 2 | 3 |
|---|---|---|---|
| | Flowset Template ID | | |
| | Length | | |
| | Record 1 Field 1 value | | |
| | Record 1 Field 2 value | | |
| | . . . | | |
| | Record 1 Field N value | | |
| | Record 2 Field 1 value | | |
| | Record 2 Field 2 value | | |
| | . . . | | |
| | Record 2 Field N value | | |
| | Padding | | |

| 0 | 1 | 2 | 3 |
|---|---|---|---|
| | 220 (Template ID) | | |
| | 1430 (total flowset length) | | |
| | 192.168.1.27 (src IP) | | |
| | 192.168.1.28 (dest IP) | | |
| | 32156 (src port) | | |
| | 80 (dest port) | | |
| | 6 (protocol TCP) | | |
| | 57 (input interface snmp index) | | |
| | 58 (output interface snmp index) | | |
| | 148573 (bytes) | | |
| | 953 (packets) | | |
| | 198.168.5.43 (src IP of flow record #2) | | |
| | . . . | | |

Fig. 7

| 0 | 1 | 2 | 3 |
|---|---|---|---|
| | 221 (Template ID) | | |
| | 1260 (total flowset length) | | |
| | 192.168.1.27 (src IP) | | |
| | 192.168.1.28 (dest IP) | | |
| | 32156 (src port) | | |
| | 80 (dest port) | | |
| | 6 (protocol TCP) | | |
| | 57 (input interface snmp index) | | |
| | 58 (output interface snmp index) | | |
| | 148573 (bytes) | | |
| | 953 (packets) | | |
| | 100 (src peer AS) | | |
| | 19284501 (input interface gid) | | |
| | 19283474 (output interface gid) | | |
| | List of customer ids which matched this flow: 121, 456, 332, 249 | | |
| | 65673 (application id based on packet inspection, e.g. HTTP) | | |
| | Worm Signatures which matched the flow: 109 (Sasser worm) | | |
| | URL from packet inspection: http://example.com/someurl/somepage | | | ns
METHOD AND SYSTEM FOR ANNOTATING NETWORK FLOW INFORMATION

CROSS REFERENCE TO RELATED APPLICATION

This application is a Continuation of co-pending U.S. application Ser. No. 11/967,130 filed Dec. 29, 2007, which is incorporated herein by reference in its entirety.

BACKGROUND OF THE INVENTION

Host computers, including servers and client computers, are typically interconnected to form computer networks. A computer network, and more generally a communications network, is a group of devices or network entities that are interconnected by one or more segments of transmission media on which communications are exchanged between those network entities. The communications can be transmitted electrically, including wireless links, or optically. The computer networks typically further comprise separate network communications devices, such as routers, switches, bridges, and hubs, for transmitting and relaying the communications between the network entities through the network's mesh.

Computer networks are typically classified by their size or by the type of entity that owns the network. Often, business organizations maintain large computer networks. These computer networks are referred to as enterprise networks. Enterprise networks are typically connected to other enterprise networks or home networks via service provider and public networks.

At the enterprise, service provider, and public network scale, network management systems are used to monitor networks. These systems can exist as stand-alone, dedicated systems or be embedded in network communications devices such as routers and switches. One specific example is NetFlow technology offered by Cisco Systems. Other tools include special-purpose systems, such as firewalls and other network security devices, that are typically used to manage the communications at boundaries between the networks.

One source of information for monitoring networks is flow information. This is defined as "a unidirectional sequence of packets with some common properties that pass through a network device." Internet Engineering Task Force, RFC 3954. Flow records are often generated by the network devices. These are often digested information concerning individual network flows or groups of network flows sharing some common characteristic(s). The flow records often include, for example, internet protocol (IP) addresses, packet and byte counts, timestamps, Type of Service (ToS), application ports, input and output interfaces, to list a few examples. This information is available from Netflow technology, for example. Generally, computer network devices that generate flow records include, for example, routers, switches, firewalls, and hubs. In other examples, packet scanners/analyzers (e.g. Arbor Networks PEAKFLOW® threat management system (TMS)) are used. Flows may be collected and exported for analysis. Flow analysis is a central component of large-scale network management and service systems.

Network management systems allow the network administrators to apply policies. Policies are typically used to govern or dictate how entities are allowed to communicate over the network, generally called security policies. These policies can be applied to entities individually, by setting operating parameters of devices separately. Policy-based management systems have simplified configuration of devices by allowing administrators to define a policy and apply this policy across groups of network entities, generally.

A policy is a collection of rules. A rule, for example, can be defined to govern what traffic a particular firewall ignores or prevents a given address or device from accessing a particular service or network resource. The rules can be applied by routers that decide whether to forward packets from or to a particular address.

Network policies are often defined and applied based on flow information. Moreover, many products are available that attempt to correlate flow information with other data sources to provide value-added analysis. These types of analysis tools are now a central component of administering large communication networks. Such analysis facilitates the creation of higher level policies that facilitate the management of the network.

By way of additional background, the process for abstracting the dataflow between the network entities is typically articulated in the context of the OSI (Open Systems Interconnection) model communications stack. The lowest layer 1 describes physical layer functions such as the transmission of bits over the communication medium, activation/deactivation of the physical connection, use of idle conditions, control bit generation/detection, start and stop, and zero bit insertion. These functions are requested by data link layer 2 functions, which control the transmission of packets over a logical communications link. Other data link functions include establishing/releasing logical connections, error detection, correction, and recovery, in conjunction with the delimiting of transmitted packets.

At the next higher level of abstraction is the network layer 3. Functions here include the transfer of units or packets between two transport entities. Further, at this layer, routing through the network is determined, including segmenting or combining packets into smaller and larger data units, the establishment, maintenance, and relinquishment of end-to-end logical circuits, and the detection and recovery from errors. Network management activities often take place at the network layer and data link layer.

Then, transport layer 4 functions handle the transmission of complete messages between network entities. At this layer, sessions between the network entities are established and then taken down. This layer ensures the correct sequence of packets, partition, and combination of messages into packets, and the control of data flow to avoid network overload.

The session layer 5 organizes and synchronizes the dialog that takes place between applications running on network entities. This provides a one-to-one correspondence between a session connection and a presentation connection at a given time. It provides for session continuity, even when transport connections may fail.

Finally, at the two highest levels of abstraction, layers 6 and 7, the presentation layer provides independence from differences between data presentations, such as encryption, by translating from application to network format, and back. The application layers support application and end user processes. However, user authentication and privacy are also considered and any constraints on data syntax are identified. At this layer, communication is application-specific.

SUMMARY OF THE INVENTION

The standard flow information that is available from network devices is limited, however. It would be desirable in computer networks to be able to add intelligence to standard network flow monitoring to implement new types of detection and analysis based on flow data.

The challenge has in the past been addressed, for example, by employing multiple flow analysis engines. Any additional information calculated about each flow is simply used internally by the flow analysis engine, however. This locally calculated flow information is not re-exported as part of the flow record. Alternatively, some products maintain separate data stores (e.g. a border gateway protocol (BGP) routing table) that is distributed separately from the flow records. Nevertheless, any receivers then have to redo the work of correlating the flow and the BGP data since available systems either distribute the original flow records and separately distribute additional data, as described above, or simply keep the flow and other databases internally. Queries are allowed that will perform flow matching against other data at query time. A report containing the resulting information about the flows can then be generated.

These solutions do not provide real-time flow information, nor is their information made available using existing flow export methods. Thus, these solutions are not nearly as scalable, and are much more restricted in the type of data they can provide. It also means that accessing the data they provide requires writing custom software, rather than being able to reuse existing flow collection and analysis infrastructure.

The present invention can be used to facilitate the creation of scalable flow monitoring solutions. The invention also demonstrates that there can be a reasonably low overhead for this approach.

An embodiment of the present invention takes in standard flow records exported from network devices such as routers, switches, firewalls, hubs, etc., and annotates the flow with additional information. This information is derived from a number of sources, including Border Gateway Protocol (BGP), Simple Network Management Protocol (SNMP), user configuration, and other, intelligent flow analysis. These annotations add information to the flow data, and can be used to perform value-added flow analysis. The annotated flow is then resent to a configurable set of destinations using standard flow formatting, e.g., Cisco System Inc.'s NetFlow technology, version 9, in one implementation. This allows the annotated flow to be processed and the enhanced information to be used by other flow analysis tools and existing flow analysis infrastructure.

Various data sources may be used to annotate the flow. These can include but are not limited to BGP, SNMP, user configuration, raw packet analysis information (e.g. from Peakflow TMS), and other flow analysis information.

Advantages over existing systems include real-time data collection, scalability and intelligence. In contrast, currently used systems require data to be collected and analyzed after the fact, often accompanied by long delays between the sending of the original flow information from the network devices and the availability of the additional information generated by the flow analysis tools.

Furthermore, by reusing the existing flow export protocol and resending the flow with additional annotations, the added information can be incorporated into existing flow monitoring tools. Existing tools need not even be able to make sense of the information added to the flow by the present invention—they can still access the original data put in the flow record by the router.

Third, by resending flow to a configurable set of destinations, the same data are reused multiple times in different network monitors for different applications.

In general, according to one aspect, the invention features a method of processing network flow information. The method comprises receiving a flow record exported from a network device and annotating the flow with additional information.

In a common implementation, the network device is any of: a router, a switch, a firewall and a packet scanner/analyzer. Also, the method includes sending the annotated flow to a configurable set of destinations using standard flow formatting.

The additional information is derived, at least in part, from a BGP source, in one example. The source and destination addresses identified in the received flow record are looked up in the BGP routing information and the BGP attributes for the matching routes are added to the flow. In the same or other examples, the additional information is derived, at least in part, from a SNMP source. The flow record is annotated with information describing interfaces which saw the flow, including interface name and description, and a unique identifier that maps into a database of additional interface information.

The additional information can be derived, at least in part, from user configuration information. The flow record is annotated with information about traffic attributes which match user configuration. The additional information can also be derived, at least in part, from raw packet analysis. The flow record is annotated with information derived from raw traffic.

In general according to another aspect, the invention features a flow annotator. This annotator comprises a flow analysis engine which receives flow data from a network device, and which selects information from at least one source to be added to the flow data. A flow encoding and distribution engine is provided that annotates the flow data with the selected data to create an annotated flow, and that transmits the annotated flow to a configurable set of destinations comprising at least one of an additional flow annotator and a flow consumer.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 4 is a schematic diagram illustrating a packet for transporting flow information;

FIG. 5 is a schematic diagram illustrating flow information in a packet;

FIG. 6 is a schematic diagram illustrating flowset information in a packet according to an embodiment of the present invention; and FIG. 7 shows one concrete example of an annotated flow packet according to an embodiment of the present invention.

DETAILED DESCRIPTION OF THE PREFERRED EMBODIMENTS

Figure 1:
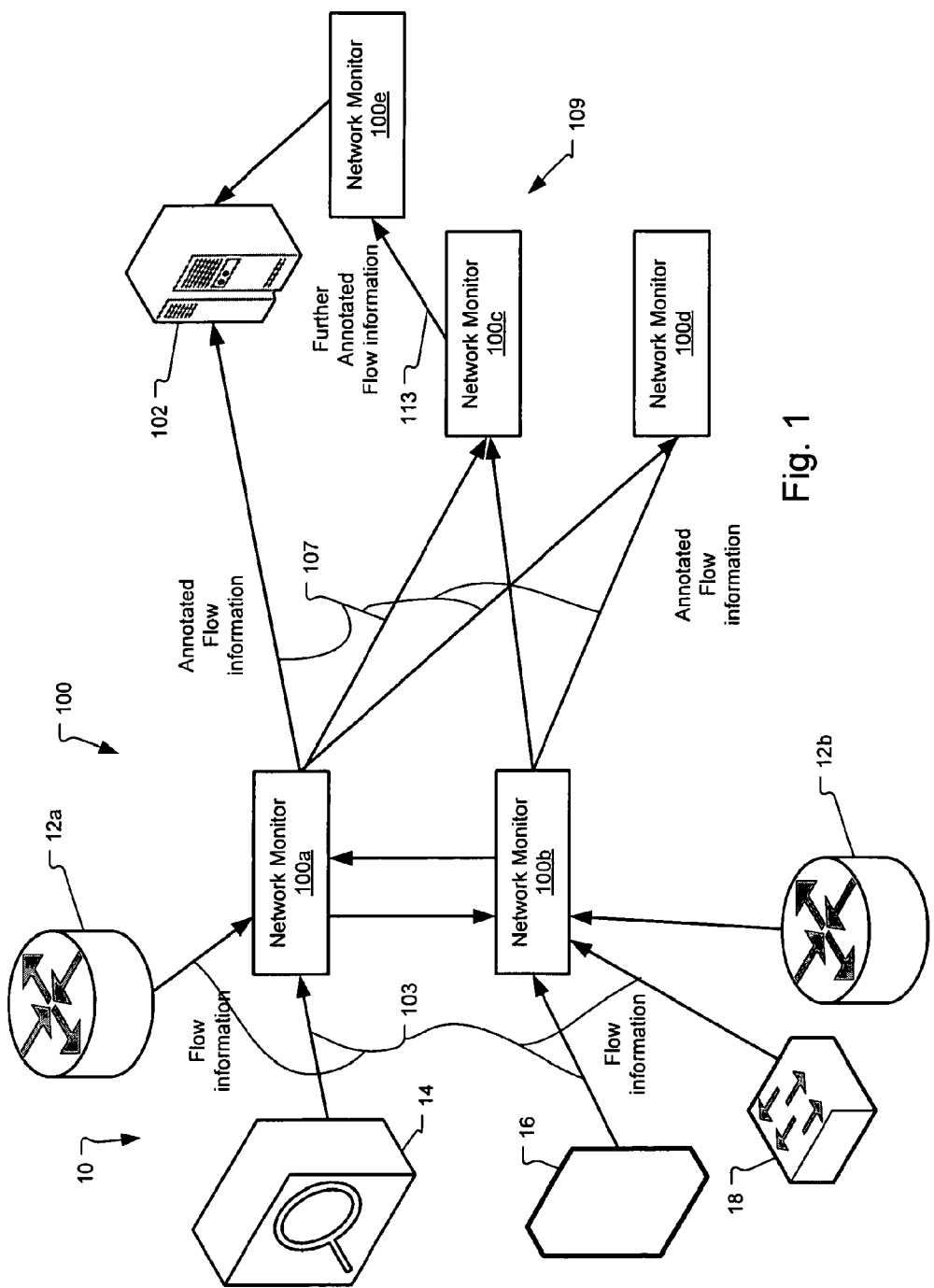
FIG. 1 is a block diagram of the inventive flow annotation system deployed within a network.

FIG. 1 is a block diagram of a flow annotation system 100 deployed within a network 10 according to the principles of the present invention.

In more detail, network communication devices such as routers 12a, 12b and/or switches 18 collect flow information from the packet information that is transmitted through the network 10 between other network communications devices, network nodes, and host computers. Flow information is also collected, in some examples from packet monitors or taps 14 that are installed usually solely to monitor packet traffic. An example here is the Netflow Analyzer offered by Cisco Systems, Inc. Other exemplary sources of flow information include network security devices, e.g., firewalls 16, that apply security policies and monitor for malicious code/packets.

The flow information 103 from these collectors is forwarded to one or more network monitors 100a, 100b. In some examples, these network monitors 100a, 100b and other network monitors in the network, 100c, 100d, 100e, function in a peer-to-peer relationship. Such a relationship is used to provide redundancy such that failure of any network monitor does not undermine the operation of other monitors. On the other hand, in some examples, master-slave relationships are defined in which one of the monitors 100 functions as master to other slave monitors. In still other examples, a separate monitor controller 102 is deployed.

Primarily, the network monitors 100 are used to monitor network activity based on the received flow information 103. In a general sense, the network monitors 100a, 100b analyze the flow to determine whether the network activity is in compliance with policies for the network 10. Such policies include network management policies related to traffic levels, for example, and network security policies related to maintaining the security of the network and protecting it against attacks, such as denial of service attacks, viruses, or worms.

According to aspects of the invention, the network monitors 100a, 100b further annotate the flow information with additional information derived from analysis of the flow information or internally generated information, such as configuration.

The network monitors 100a, 100b annotate the flow information and send the annotated flow information 107 to each other and also various flow consumers 109, which include additional flow annotating network monitors 100c, 100d and also possibly the controller 102.

The additional flow annotators 100c, for example, output one or more further annotated flows 113 to further flow consumers and/or annotators 100e, in one example.

Figure 2:
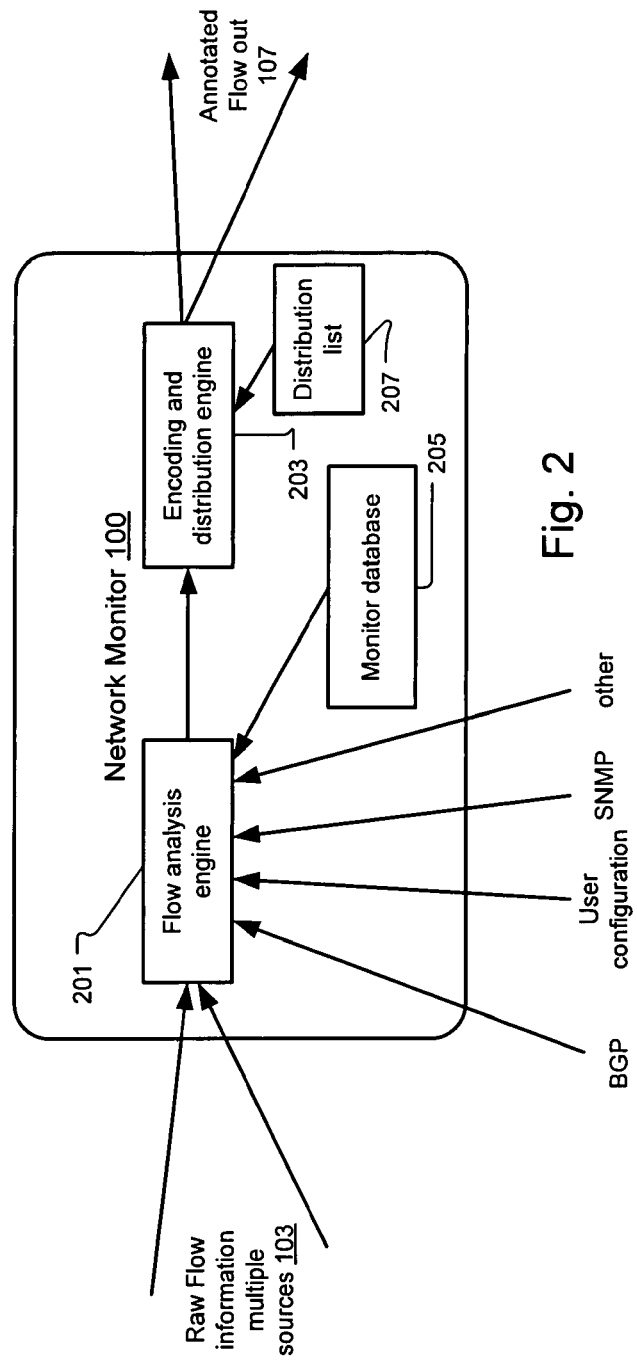
FIG. 2 is a schematic diagram of the flow annotating network monitor according to the present invention.

FIG. 2 is a schematic diagram of the flow annotating network monitors 100 of FIG. 1. Here the monitor 100 is logically broken down into two functions: a flow analysis engine 201 and a flow encoding and distribution engine 2203. Although shown separately, these two functions are often combined into a single operating module, implemented in hardware, software, or a combination thereof.

When the flow data 103 are received from the network devices 14, 16, 18, the network monitor 100 applies available policies to the flow and analyzes the flow in term of BGP, SNMP, its own configuration information, and other data sources including one or more internally maintained databases 205.

The annotated flow is then encoded and distributed by the distribution engine 2203 to various consumers of the flow information. A distribution list 207 identifies the entities that will receive the annotated flow information.

Figure 3:
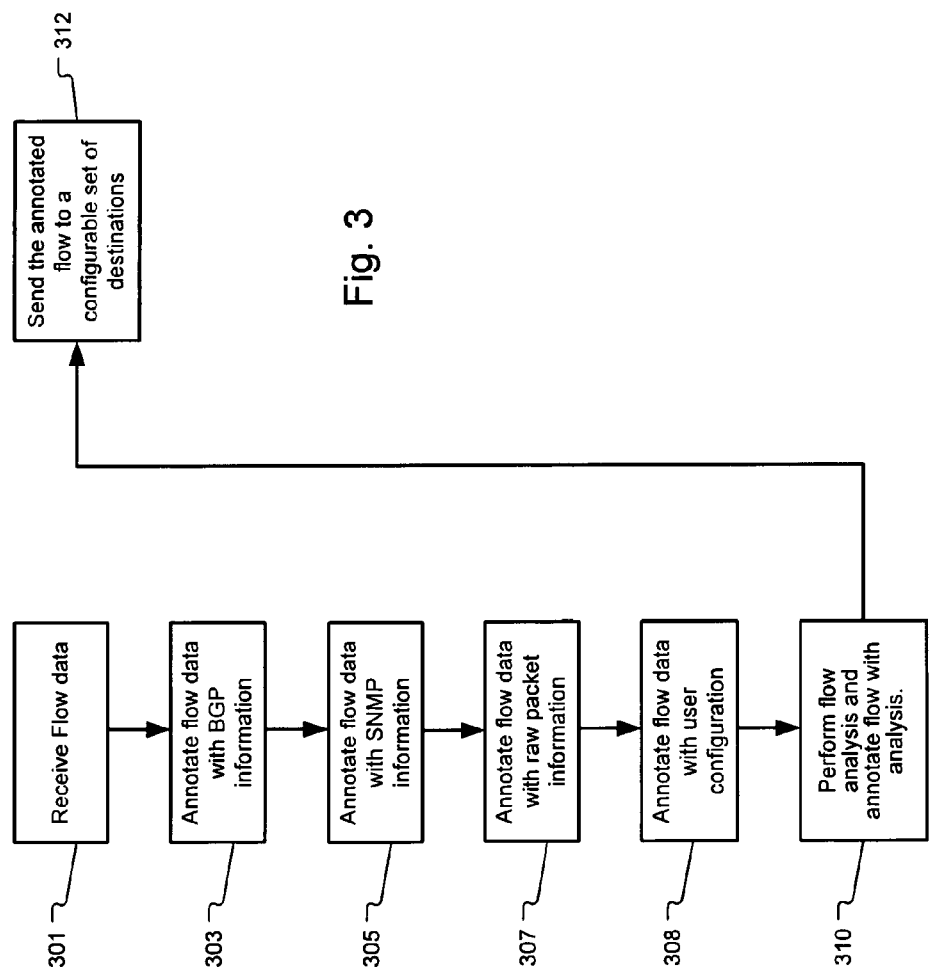
FIG. 3 is a flowchart showing the operation of flow annotating network monitor according to an embodiment of the present invention.

FIG. 3 is a flowchart showing the operation flow analysis engine 2201 and the encoding and distribution engine 2203 of the network monitor 100. One skilled in the art would recognize, however, that the steps relating to annotating flow according to a given input, e.g., BGP, SNMP, etc., could be performed in a different order.

In step 301, flow data are received. This is, in examples, standard flow records, for example from network communication devices such as routers 12 and switch 18 or other network device 14, 16; or alternatively, it is annotated flow records from another flow annotating monitor.

In step 303, if BGP information is available, then the source and destination addresses of the flow are looked up in the BGP routing information by the flow analysis engine 2201 and the BGP attributes for the matching routes are added to the flow by the flow encoding and distribution engine 2203.

Similarly, in step 305, if SNMP is available, then the flow analysis engine 2201 identifies information about the interfaces that saw the flow in one example, including interface name and description, and a unique identifier that maps into a database of additional interface information. The flow encoding and distribution engine 2203 then annotates the flow with the identified interface information.

In step 307, if raw packet analysis is available, then the flow data are preferably annotated with information about the raw traffic, including application identifier(s) based on layer 4-7 payload analysis, virtual local area network (VLAN) identifiers, and other information from the packet that would not normally be available in the original flow record.

In step 308, if user configuration is available, then the flow is annotated with information about traffic attributes that matched user configuration. For example, if the network administrator configured the network monitor 100 to match a specified IP address range to a user-readable identifier (name), then the source and/or destination of the flow is annotated to indicate that it matches that user-defined identifier.

In addition to the above data sources, the system performs its own flow analysis and annotates the flow with useful information in step 310. This information can include, for example, network topology information and/or signature detection.

For example, network topology information potentially includes information as to whether the flow is entering or leaving the network 10 at this point; whether the flow is entering or leaving through a peering edge or customer-facing interface; whether the flow is entering or leaving a customer site or other user-defined part of the network, etc. In other examples, the network topology information includes: 1) whether the flow belongs to a VPN (virtual private network); 2) if so, to which VPN the flow belongs; and 3) whether the flow is leaving or entering the VPN.

In other examples, the flow information is annotated with contents of the actual packets from raw packet inspection, including but not limited to universal resource locators (URLs) and other hypertext transport protocol (http) post information, voice and/or video call endpoints and setup information for voice over internet protocol (VOIP) and/or session initiation protocol (SIP) traffic, filenames or other information from peer to peer (P2P) and bittorrent traffic.

In examples where the flow information is annotated with network topology information, the annotation data includes whether the flow belongs to a VPN and is entering or leaving a particular VPN Site, whether the flow is entering or leaving through a paid transit or complementary peering link, for example.

In still other examples, the flow information is annotated with policy information. For example, the annotated data describes whether the flow matches a configured network traffic policy signature, or not, and identifies that signature.

Signature detection includes flags that indicate if the flow matches a known worm or denial of service (DOS) attack signature, or other signatures either auto-learned by the system or configured by the user.

Generally, any given flow may be annotated by any combination of the above information. The information chosen for annotation can be based on user configuration or automatically determined by the system based on that data that are available for the flow.

In step 312, the annotated flow is sent to a configurable set of destinations that often make use of both the original flow information and the flow annotations to do useful work, either by reporting on the flow information, detecting network problems, generating alerts, or other analysis.

This annotation and flow redistribution is preferably performed in real-time. The annotated flows further preferably use a standard flow representation method to encode and send the annotated flows, such as the industry-standard NetFlow version 9 format, which is maintained by Cisco Systems Inc. and which has also been implemented by Juniper, and which is related to ipfix (RFC 3955). Annotated flows can thus be processed by both standard flow analysis tools as well as flow analyzers enhanced to make use of the additional annotations.

In one embodiment, the packets includes the annotated flow information are implemented using Netflow. According to one implementation, new "field type definitions" are added and populated with the exported annotated flow information.

In more detail, Netflow v9 information is sent in packets that contain header information and then one or more flow records.

All version 9 flow packets (including annotated flow packets) preferably use a standard header format, which is defined by the Netflow v9, in one implementation.

In more detail, as shown in FIG. 4, the packet headers include the protocol (Netflow) version, record count, system uptime, a time stamp, sequence number and source identification.

FIG. 5 shows the flow information. That is, after the header, each packet then contains one or more flow records in a FlowSet. The FlowSets use the following format: flowset template identification indicating the format for the flowset, and the length. Then a series of records are attached, each record containing N field values.

The content and format of these records is defined by a Netflow v9 template, which is sent periodically by the flow source using the Template FlowSet packet format. This is a standard packet format for NetFlow v9. Each template sent by a flow source is given a unique ID, which must be placed in the FlowSet Template ID field of a FlowSet packet, so that the receiver can know how to decode the FlowSet records.

The template defines which data fields are present in each FlowSet and in which order, what values represent, and what size values are. Some example field types that might be defined in a standard NetFlow v9 Template include:

| Field Type | Field ID | Field Length | Description |
|---|---|---|---|
| IPV4 SRC ADDR | 8 | 4 | IPv4 Source Address |
| IPV4 DST ADDR | 12 | 4 | IPv4 Destination Address |
| L4 SRC PORT | 7 | 2 | TCP/UDP source port number |
| L4 DST PORT | 11 | 2 | TCP/UDP dest. port number |
| PROTOCOL | 4 | 1 | IP Protocol |
| INPUT SNMP | 10 | 2 | Input interface SNMP index |
| OUTPUT SNMP | 14 | 2 | Output interface SNMP index |

Based on the above template, FIG. 6 shows a sample FlowSet packet. (For readability, the size of the fields has been rounded up to 4 bytes, even though in actuality they may use different sizes).

According to one embodiment, annotated flow adds new field type definitions to represent the new information being added to the annotated flows. An annotated flow sender (see reference 100) sends out an annotated flow template using the standard flow template format and incorporating these new field types. The sender then sends annotated flows using the standard FlowSet format and incorporating the new information defined by the template definition. Example, additional template field types are show in the following table:

| Field Type | Field ID | Field Length | Description |
|---|---|---|---|
| SRC_PEER_AS | 66 | 2 | AS Number of source BGP peer |
| INPUT_IFACE_GID | 67 | 4 | Reference ID of input interface in an interface database |
| OUTPUT_IFACE_GID | 68 | 2 | Reference ID of output interface in an interface database |
| CUSTOMER_MATCH_4 | 69 | 8 | List of 4 customer IDs that matched the flow |
| APPLICATION_ID | 90 | 4 | ID of flow's application based on packet inspection |
| WORM_MATCH | 91 | 4 | ID of a worm signature which matched the flow |
| HTTP_URL | 92 | 256 | URL contained by HTTP packets, based on packet inspection |

Note that in many cases the value is defined as an identification. It is assumed that these identifications are well-known references to either a public or private database record, or based on a user-configured mapping (e.g. to a customer name).

FIG. 7 shows one concrete example of an annotated flow packet. It uses a flow template that was the concatenation of all template fields defined above, i.e. the "standard" flow template plus the example flow annotation fields. (Note that again, field sizes are shown in 4-byte multiples for readability, even though the actual packet may store some fields as a different size.)

The benefit of the above-described flow annotation approach is that all standard flow template fields can now be incorporated into annotated flow, and then additional template fields added to provide arbitrary information. When the flow is re-exported with the additional information, the ability of existing flow analysis software to decode and read the standard flow fields is not impacted. On the other hand, a scalable and flexible way to support new analysis software is provided, which can make use of both the standard and new flow annotation fields, from the same NetFlow v9 packet.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
receiving a data packet flow record from a first network device by a second network device, the data packet flow record including initial network flow information from the first network device in a standard flow record format;
analyzing the initial network flow information of the received data packet flow record by the second network device to determine one or more additional network flow attributes to be annotated in the received data packet flow record;
encoding the one or more additional network flow attributes in the received data packet flow record while maintaining the initial network flow information by the second network device to yield an enhanced data packet flow record, the encoding adding new field type definitions to represent the additional network flow attributes; and
distributing the enhanced data packet flow record having the encoded additional network flow attributes from the second network device to one or more additional network devices according to a configurable distribution list, the initial network flow information of the enhanced data flow record is accessible by each network device of the one or more additional network devices when at least one network device of the additional network devices is not configured to interpret the one or more additional network flow attributes.

2. The method as recited in claim 1, wherein the second network device is a first network monitoring device, the method further comprising:
receiving by a second network monitoring device the enhanced data packet flow record having the annotated information distributed from the first network monitoring device;
analyzing the enhanced data packet flow record having the encoded one or more additional network flow attributes by the second network monitoring device to determine additional information to be annotated in the enhanced data packet flow record; and
encoding, in the enhanced data packet flow record, the determined additional information to be annotated by the second network monitoring device.

3. The method as recited in claim 2 further comprising distributing the enhanced data packet flow record having the additional encoded annotated information from the second network monitoring device to a third network monitoring device according to a distribution list provided in the second network device.

4. The method as recited in claim 1,
wherein the data packet flow record includes initial network flow information from a Border Gateway Protocol (BGP) source,
wherein, the analyzing step comprises analyzing the network flow information to determine BGP attributes for one or more matching routes of the BGP source to be annotated in the received data packet flow record, and
wherein the encoding step comprises encoding the BGP attributes in the received data packet flaw record.

5. The method as recited in claim 1 wherein the one or more additional network flow attributes include Simple Network Management Protocol (SNMP) attribute.

6. The method as recited in claim 1 wherein the one or more additional network flow attributes include layer 4-7 payload attributes or virtual local area network (VLAN) attributes.

7. The method as recited in claim 1 wherein the one or more additional network flow attributes relate to data flow traffic based upon user configuration information.

8. The method as recited in claim 1 wherein the one or more additional network flow attributes relate to network topology or signature detection attributes.

9. The method of claim 1 wherein the first network device and the second network device are any of: a router, a switch, a firewall, a network monitoring device, and a packet scanner/analyzer.

10. A method, comprising:
receiving a data packet flow record from a first network device in a first network monitoring device, the data packet flow record including initial network flow information from a Border Gateway Protocol (BGP) source in a standard flow record format;
analyzing the initial network flow information of the received data packet flow record by the first network monitoring device to determine BGP attributes for one or more matching routes of the BGP source to be annotated in the received data packet flow record;
encoding the BGP attributes in the received data packet flow record while maintaining the initial network flow information by the first network monitoring device to yield an enhanced data packet flow record, the encoding adding new field type definitions to represent the BGP attributes;
distributing the enhanced data packet flow record having the annotated BGP information from the first network monitoring device to one or more additional network monitoring devices according to a distribution list provided in the first network monitoring device, the initial network flow information of the enhanced data flow record is accessible by each network device of the one or more additional network devices when at least one network device of the additional network devices is not configured to interpret the one or more network BGP attributes.

11. A communication system, comprising:
a first network monitor device including:
a flow analysis engine adapted and configured to:
receive data packet flow records from a first network device, the data packet flow records include initial network flow information from the first network device in a standard flow record format;
analyze the initial network flow information of the received data packet flow record by the flow analysis engine to determine one or more additional network flow attributes to be annotated in the received data packet flow record;
an encoding and distribution engine adapted and configured to:
encode the one or more additional network flow attributes in the received data packet flow record while maintaining the initial network flow information to yield an enhanced data packet flow record, the encoding adding new field type definitions to represent the one or more additional network flow attributes; and
distribute the enhanced data packet flow record having the encoded network flow attributes to one or more additional network monitoring devices in a communications network according to a distribution list provided by the encoding and distribution engine, the initial network flow information of the enhanced data flow record is accessible by each network device of the one or more additional network devices when at least one network device of the additional network devices is not configured to interpret the one or more network flow attributes.

12. The communication system recited in claim 11 further including:
- a second network monitor device including:
  - a flow analysis engine adapted and configured to:
    - receive the enhanced data packet flow record from the first network monitor device;
    - analyze the received data packet flow record having the encoded one or more additional network flow attributes to determine information to be additionally annotated in the enhanced data packet flow record;
  - an encoding and distribution engine adapted and configured to:
    - encode, in the enhanced data packet flow record, the determined additional information selected from the group consisting of: Border Gateway Protocol (BGP) attributes, Simple Network Management Protocol (SNMP) attributes, payload attributes, Virtual Local Area Network (VLAN) attributes, attributes relating to data flow traffic based upon user configuration information, attributes relating to network topology, signature detection attributes, network topology attributes and signature detection attributes; and
    - distribute the enhanced data packet flow record having the additional annotated information from the second network monitoring device to another device in a network.

13. The communication system as recited in claim 11 wherein the one or more additional network flow attributes include Border Gateway Protocol (BGP) attributes.

14. The communication system as recited in claim 11 wherein the one or more additional network flow attributes include Simple Network Management Protocol (SNMP) attributes.

15. The communication system as recited in claim 11 wherein the one or more additional network flow attributes include attributes relating to layer 4-7 payload attributes or virtual local area network (VLAN).

16. The communication system as recited in claim 11 wherein the one or more additional network flow attributes include attributes relating to data flow traffic based upon user configuration information.

17. The communication system as recited in claim 11 wherein the one or more additional network flow attributes include attributes relating to network topology or signature detection attributes.

18. The method of claim 11 wherein the first network monitoring device is any of: a router, a switch, a firewall and a packet scanner/analyzer.

* * * * *

UNITED STATES PATENT AND TRADEMARK OFFICE
CERTIFICATE OF CORRECTION

PATENT NO. : 8,879,415 B2  
APPLICATION NO. : 13/782776  
DATED : November 4, 2014  
INVENTOR(S) : Craig H. Labovitz et al.

Page 1 of 1

It is certified that error appears in the above-identified patent and that said Letters Patent is hereby corrected as shown below:

In the Claims

Claim 4, column 9, line number 64, change flaw to --flow--;

Claim 5, column 9, line number 67, change attribute to --attributes--; and

Claim 15, column 12, line number 16, after "(VLAN)" add --attributes--.

Signed and Sealed this  
Seventeenth Day of February, 2015

Michelle K. Lee  
*Deputy Director of the United States Patent and Trademark Office*